E. A. JOHNSTON.
TRACTION WHEEL.
APPLICATION FILED FEB. 3, 1913.
1,139,769.
Patented May 18, 1915.
2 SHEETS—SHEET 1.
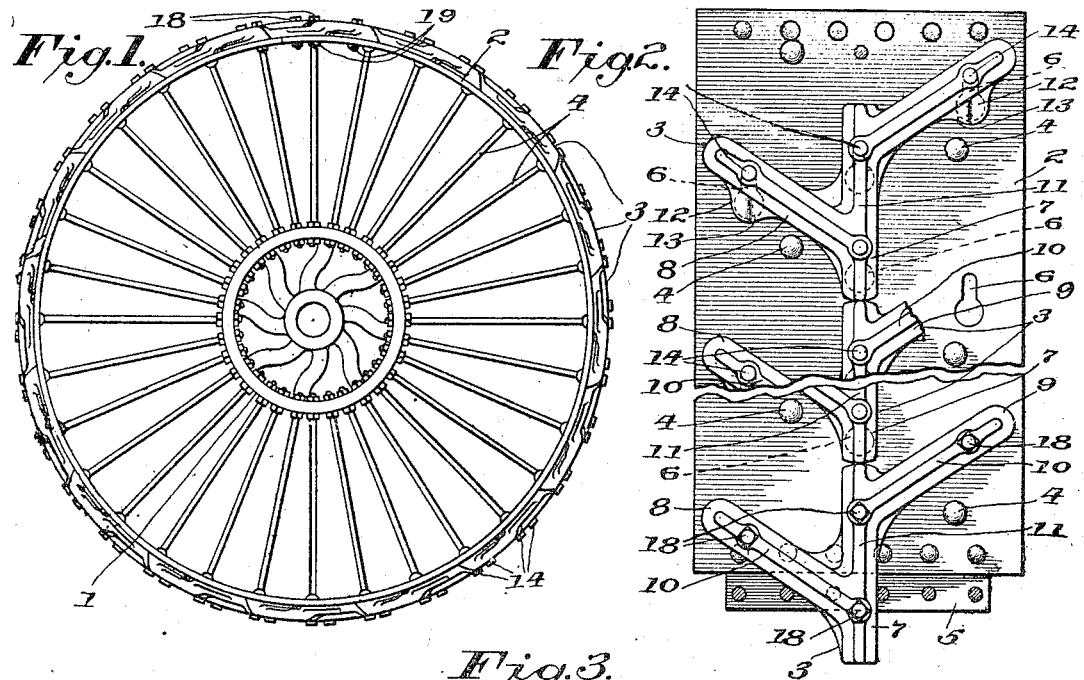
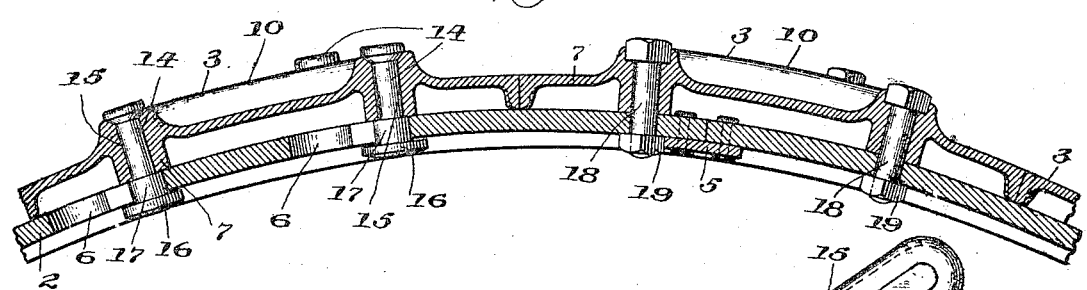
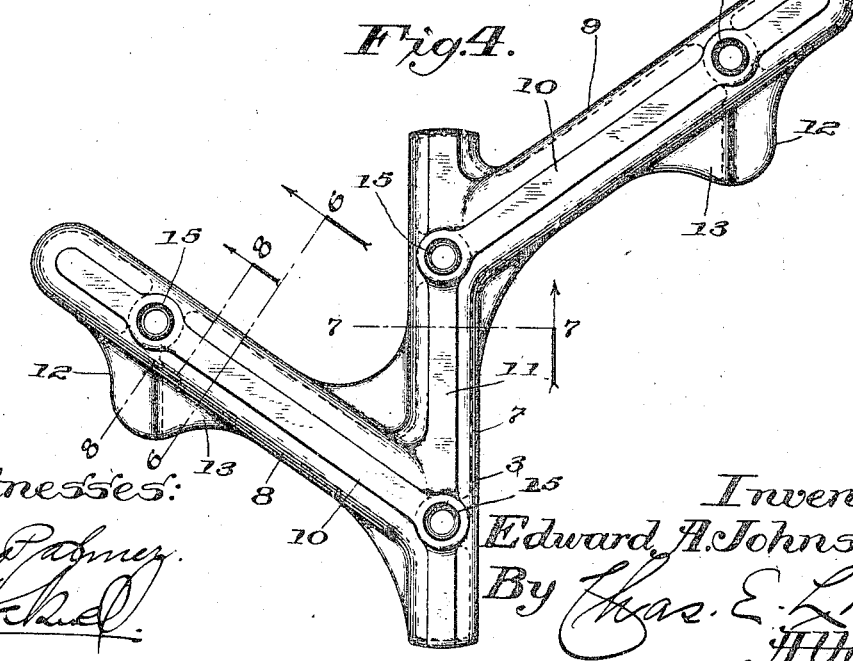
Witnesses:
Inventor:
Edward A. Johnston,
By Chas. E. Lord
Atty.

E. A. JOHNSTON.
TRACTION WHEEL.
APPLICATION FILED FEB. 3, 1913.
1,139,769.
Patented May 18, 1915.
2 SHEETS—SHEET 2.
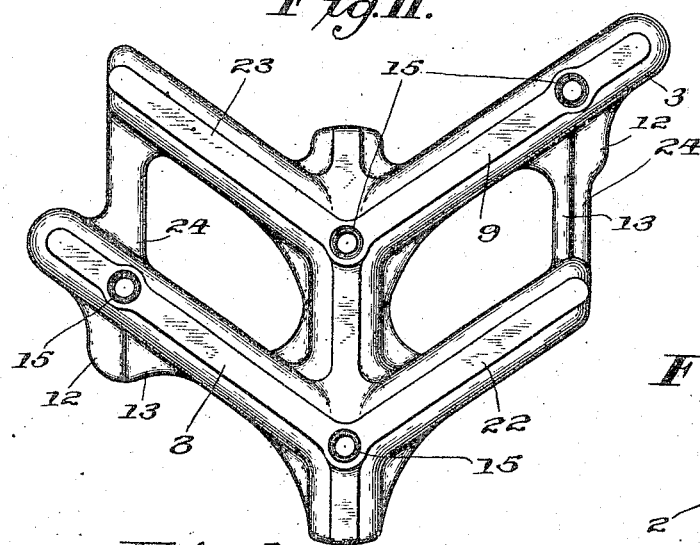
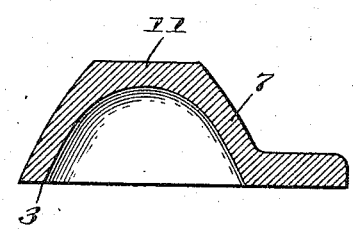
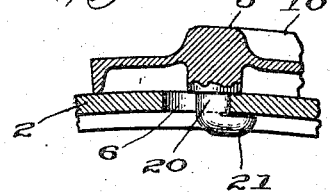
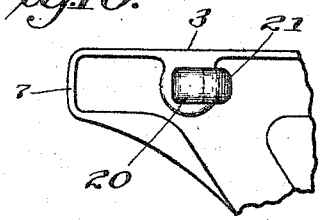
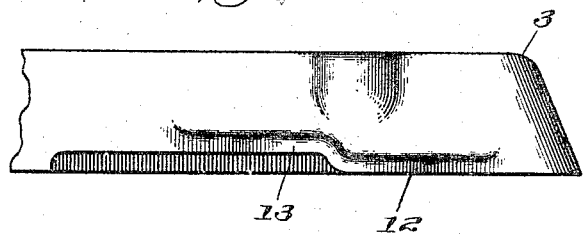
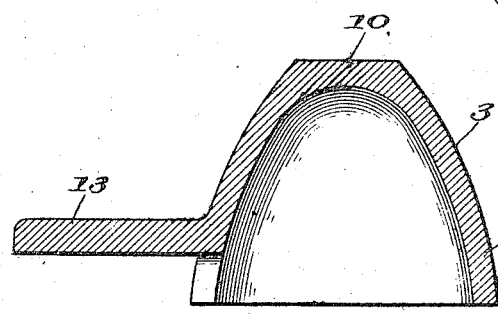
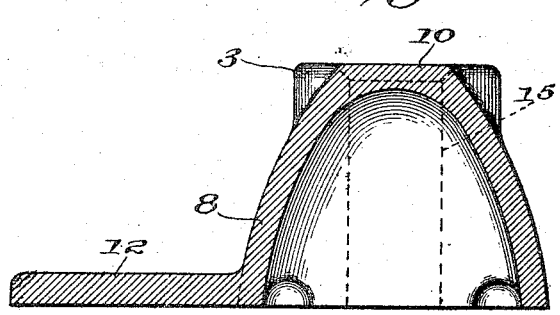
Witnesses:
Inventor:
Edward A. Johnston,
By Chas. E. Lord
Atty

UNITED STATES PATENT OFFICE.

EDWARD A. JOHNSTON, OF CHICAGO, ILLINOIS, ASSIGNOR TO INTERNATIONAL HARVESTER CORPORATION, A CORPORATION OF NEW JERSEY.

TRACTION-WHEEL.

1,139,769.   Specification of Letters Patent.   Patented May 18, 1915.

Application filed February 3, 1913. Serial No. 745,843.

*To all whom it may concern:*

Be it known that I, EDWARD A. JOHNSTON, a citizen of the United States, residing at Chicago, in the county of Cook and State of Illinois, have invented certain new and useful Improvements in Traction-Wheels, of which the following is a full, clear, and exact specification.

My invention relates to traction wheels.

It has for its object to increase the traction of a wheel.

A further object of my invention is to improve and simplify the construction of traction wheels by providing traction lugs thereon which are readily attached thereto in a secure manner and at the same time are readily removable therefrom when desired.

I attain this object by providing improved traction lugs carried upon the rim or tire of the wheel in an improved manner.

In order to disclose my invention clearly and fully, I have illustrated two embodiments of the same in the accompanying drawings. It is to be understood, however, that the forms shown herein are susceptible of modification.

Figure 1 is a side elevation of a wheel; Fig. 2 is a plan view of the tire thereof when removed from the wheel; Fig. 3 is a longitudinal sectional view of a portion of the tire; Fig. 4 is a top plan view of one of the traction lugs; Fig. 5 is a side elevation of a portion of one of the same; Fig. 6 is a sectional view on the line 6—6 of Fig. 4; Fig. 7 is a sectional view on line 7—7 of Fig. 4; Fig. 8 is a sectional view on line 8—8 of Fig. 4; Fig. 9 is a sectional view of a modified form of lug and attachment means therefor; Fig. 10 is a bottom plan view of the construction shown in Fig. 9; Fig. 11 is a plan view of a further modified form of lug.

The construction shown, when broadly considered, comprises a traction wheel 1 having a tire 2 carrying a plurality of traction lugs 3 of improved construction attached to said tire in an improved manner, hereinafter more specifically described.

The wheel 1 may be of any desired construction. As shown herein, it is provided with a plurality of radially extending metal spokes 4 riveted at their outer ends to the tire 2. This rim or tire 2 is preferably in the shape of a wide metal band which is provided with means adapted to receive and position the lugs 3 thereon. In the form shown herein, the tire 2 is formed of one piece of metal bent into circular shape and attached at its ends by a suitably riveted or otherwise secured transversely extending attaching strip 5. Between the ends of the tire 2 a plurality of series of longitudinally extending slots 6 are provided. These slots are preferably arranged in three parallel series as shown in Fig. 2. It is here to be noted that the slots in the series on the right and left side of the center series are preferably spaced apart farther from each other so that the number of these slots is less than that in the center series and that the several series of slots coöperate to form a substantially zig-zag series of slots extending around the tire 2. In the form shown in Figs. 2 and 3, the slots are similar in outline and one end of each of the same is enlarged and substantially circular in shape.

The lugs 3 are removably attached to the tire 2 by means hereinafter described. These lugs may assume different forms. In the construction shown in Fig. 4, the lug is provided with a longitudinally extending arc shaped body portion 7 and laterally extending integral arms 8 and 9 branching off from the body portion 7 in opposite directions at different points in its length and at an angle thereto. As shown in the sections of the lug shown in Fig. 4, illustrated in Figs. 6, 7, and 8, each of these lugs is of hollow construction and provided with raised traction surfaces 10 and 11 of different heights so disposed with respect to each other as to provide a good traction surface. It is further to be noted that the arms 8 and 9 of each lug are provided with rearwardly extending longitudinally reinforced extensions 12 having raised portions 13 enabling them to pass freely over the ends of the spokes 4 protruding above the outer surface of the tire 2. As shown in Fig. 3, these lug members are each attached to the tire 2 by means of a plurality of countersunk rivets or other attaching means 14 which extend through openings or holes 15 in the same and preferably have their outer ends protruded above the surface of the lug to increase the traction effect thereof. In the lug construction shown in Fig. 4, one of these rivets is provided near the outer end of the arm 8, while another is provided at the junction of the arm with the body portion 7, a similar arrangement being provided for arm 9. These rivets coöperate with the slots 6 in the tire 2 to removably attach the lugs to the latter and for this purpose are provided with enlarged round inner ends or heads 16, adapted to pass through the rounded portions of the slots 6, and connecting shanks 17 of reduced diameter, adapted to be moved longitudinally in the elongated portions of the slots. It is to be noted in this connection that due to the construction of the lugs and the provision of extensions 12 upon the lugs, the clogging of the slots 6 in the tire 2 is effectually prevented. As shown in Fig. 1, these removable lugs are disposed around the periphery of the wheel and locked thereon against displacement by improved means. This means, as shown in Figs. 2 and 3, comprises an end lug of the same construction as the other lugs but bolted to the tire 2 by suitable bolts 18 which protrude through the openings in the lug adapted to receive the rivets 14, and are fastened to the under surface of the tire by suitable nuts or other means 19. If desired, these bolts may extend through portions of certain slots 6 and be held securely to the tire by providing enlarged ends on the same or suitable washers or the like. In a preferred form, however, the openings in the tire 2 adapted to receive the bolts 18 are preferably made to accurately fit the bolts. Attention is further directed to the fact that this holding or locking lug is positioned over the joint between the ends of the tire 2 so that it acts as an additional means for holding the ends of the same together.

In Figs. 9 and 10, I have shown a modified form of lug and attaching means for the same. As shown in this construction, the lugs instead of being provided with rivets 14 may be provided with integral downwardly extending ears or lugs 20 provided with laterally extending lips 21. I have further illustrated in Fig. 11 a modified form of lug construction wherein, instead of employing a lug of the construction shown in Fig. 4, I provide the arms 8 and 9 shown in that construction with fellow arms 22 and 23 extending substantially at right angles thereto from the point where the same branch off from the body portion. It is to be noted that in this construction the number of rivets required is the same, and that integral webs 24 are provided extending between the arms to strengthen the same. It is further to be noted that the lug presents a larger traction surface.

When it is desired to assemble a wheel of the construction shown herein, it is only necessary for the assembler to slip the heads 16 on the lug rivets through the enlarged or round portion of the slots 6, and then slide the lugs forward so that the shanks 17 of these rivets pass into the restricted portions of the slots 6 to engage the end wall of the same. In this position the lugs are located about the periphery of the wheel and act to hold each other in position since no lug may be removed from the tire except by a movement of the adjacent lug in the opposite direction to that used in attaching it to the tire. Obviously, when the lugs have been so positioned about the periphery of the tire, the key lug is then bolted into place to lock all of the lugs on the tire and at the same time lock the ends of the tire together. When it is desired to remove the lugs or a lug for any reason it is only necessary to remove this key lug and then push the others back in their slots to permit them or any particular one of them to be readily taken off.

It is to be noted that the construction shown herein permits of increased facility in assembling and removing the parts through the provision of readily removable lugs and at the same time provides means for securely positioning the lugs upon the tire of the wheel. Attention is further directed to the fact that, should any of the arms on the lugs break, the connection of the series of lugs is not in any way interfered with, and that a break in the body portion of a lug likewise will not enable the lugs to fall because of the interlocking of the adjacent lugs. It is also to be noted that when for any reason it is desired to remove a lug it is only necessary to remove the key lug whereupon all of the lugs at one side of the lug in question may be pushed backward by a single movement to such a position as to permit the removal of the same and after a new lug has been inserted, the same may be immediately thrown forward and locked in position by the replacing of the key lug. Attention is also directed to the fact that in the construction shown herein, during the normal rotation of the wheel the lugs always occupy positions against the ends of the restricted portions of the slots thus affording an exceedingly rugged construction and positive driving action.

While I have described two forms of my invention in this application in order to clearly and fully describe the same, it is to be understood that the embodiments thereof shown herein may be modified without departing from the spirit and scope of the invention.

What I claim as new and desire to secure by Letters Patent is:

1. In a traction wheel, a tire having elongated slots with locking portions, a plurality of traction lugs having portions thereof protruding through said slots and normally engaging said locking portions, and a locking lug bolted to said tire and locking all of said lugs to said tire.

2. In a traction wheel, a tire having longitudinally extending slots therein, a plurality of traction lugs having portions movable longitudinally of said slots, and a key lug locking all of said lugs in a predetermined position.

3. In a traction wheel, a tire, a plurality of spokes having their ends riveted to the outer surface of said tire, a plurality of lugs, each provided with means for removably attaching the same to said tire, and a key lug locking all of said lugs to said tire and itself connecting the ends of said tire.

4. In a traction wheel, a tire, a plurality of spokes protruding through the outer surface of said tire, a plurality of lugs removably attached to said tire and freely movable over the extremities of said spokes, and a key lug locking all of said lugs in position upon said tire.

5. A traction lug comprising a longitudinally disposed body portion having a plurality of integral arms protruding angularly therefrom in opposite directions adjacent the opposite ends of the same, and means carried by the lug for removably attaching it to a support by shifting said lug relative to the support.

6. A traction lug comprising an arc shaped body portion having integral laterally extending arms projecting angularly therefrom in opposite directions, and a plurality of fastening means extending through said body portion at the points of junction of said arms and through said arms at points between the ends of the same, each of said fastening means being provided with an enlarged head on the underside of said lug.

7. In a traction wheel, a tire having a slot with a relatively large opening and a restricted portion extending from said large opening, and a lug removably attached to said tire, said lug having a portion which is passed through said relatively large opening and normally occupies said restricted portion for effecting the attachment of said lug to said tire.

8. In a traction wheel, a tire having a plurality of elongated openings with restricted portions, and a plurality of lugs removably secured to said tire, said lugs having portions which are successively placed into said openings and shifted to the restricted portions thereof bringing adjacent lugs into contact with each other, the last lug being locked to said rim to prevent movement of the remaining lugs.

9. In a traction wheel, a tire having elongated openings with connected enlarged and restricted portions, and a plurality of lugs removably attached to said tire, said lugs having portions coöperating with said openings and being successively placed in the enlarged portions and moved into the restricted portions of said slots and secured against radial movement thereby, adjacent lugs engaging each other, the last lug being locked to said rim to prevent movement of the remaining lugs thereon.

10. In a traction wheel, a tire having a slot with a relatively large opening and a restricted portion extending from said large opening, two lugs removably attached to said tire, one of said lugs having a portion which is passed through said relatively large opening and normally occupies said restricted portion for effecting the attachment of said lug to said tire, and locking means on the second lug coöperating with said tire for locking said first lug to said tire.

Chicago, Ill., Jan. 21, 1913.

In testimony whereof I affix my signature, in the presence of two witnesses.

EDWARD A. JOHNSTON.

Witnesses:
 S. E. HOUSTON,
 A. L. CROOKS.